United States Patent
Ekner

(10) Patent No.: US 9,807,034 B2
(45) Date of Patent: *Oct. 31, 2017

(54) SYSTEM AND METHOD FOR CREATING A SCALABLE MONOLITHIC PACKET PROCESSING ENGINE

(71) Applicant: Altera Corporation, San Jose, CA (US)

(72) Inventor: Hartvig Ekner, Holte (DK)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,643

(22) Filed: Sep. 15, 2014

(65) Prior Publication Data

US 2015/0003447 A1    Jan. 1, 2015

Related U.S. Application Data

(63) Continuation of application No. 14/050,975, filed on Oct. 10, 2013, now Pat. No. 8,868,801, which is a
(Continued)

(51) Int. Cl.
| | |
|---|---|
| *G06F 3/00* | (2006.01) |
| *G06F 13/00* | (2006.01) |
| *G06F 13/36* | (2006.01) |
| *G01R 31/08* | (2006.01) |
| *H04L 12/50* | (2006.01) |
| *H04L 12/28* | (2006.01) |

(Continued)

(52) U.S. Cl.
CPC ............. *H04L 49/25* (2013.01); *G06F 13/38* (2013.01); *H04L 45/583* (2013.01); *H04L 49/15* (2013.01); *H04L 49/90* (2013.01); *H04L 49/1523* (2013.01); *H04L 49/1546* (2013.01); *H04L 49/254* (2013.01); *H04L 49/3027* (2013.01); *H04L 49/45* (2013.01); *H04L 49/557* (2013.01)

(58) Field of Classification Search
CPC ....... H04L 47/10; H04L 45/60; H04L 47/125; H04L 67/1097; H04L 49/103; G06F 13/385; G06F 11/1658; G06F 11/184; G06F 15/8007; G06F 17/30985; G06F 17/505; G06F 7/535; G06F 9/52
USPC ......... 710/1, 4, 30, 33, 39, 52, 56, 110, 113, 710/300, 316; 370/216, 235, 235.1, 252, 370/360, 384, 389, 392, 412, 463, 516
See application file for complete search history.

(56) References Cited

U.S. PATENT DOCUMENTS

| | | | |
|---|---|---|---|
| 5,162,988 A | 11/1992 | Semerau et al. | |
| 5,450,313 A * | 9/1995 | Gilbert | G06F 8/45 709/216 |

(Continued)

FOREIGN PATENT DOCUMENTS

| | | |
|---|---|---|
| EP | 1 744 489 A1 | 1/2007 |
| EP | 1744489 A1 * | 1/2007 |

*Primary Examiner* — Farley Abad
*Assistant Examiner* — Henry Yu
(74) *Attorney, Agent, or Firm* — Fletcher Yoder P.C.

(57) ABSTRACT

A novel and efficient method is described that creates a monolithic high capacity Packet Engine (PE) by connecting N lower capacity Packet Engines (PEs) via a novel Chip-to-Chip (C2C) interface. The C2C interface is used to perform functions, such as memory bit slicing and to communicate shared information, and enqueue/dequeue operations between individual PEs.

24 Claims, 4 Drawing Sheets

Related U.S. Application Data continuation of application No. 12/145,466, filed on Jun. 24, 2008, now Pat. No. 8,566,487.

(51) Int. Cl.
   *H04L 12/66* (2006.01)
   *H04L 12/947* (2013.01)
   *H04L 12/775* (2013.01)
   *H04L 12/933* (2013.01)
   *G06F 13/38* (2006.01)
   *H04L 12/861* (2013.01)
   *H04L 12/937* (2013.01)
   *H04L 12/935* (2013.01)
   *H04L 12/931* (2013.01)
   *H04L 12/939* (2013.01)

(56) References Cited

U.S. PATENT DOCUMENTS

| | | | |
|---|---|---|---|
| 5,603,064 A | 2/1997 | Bennett | |
| 6,160,819 A * | 12/2000 | Partridge | H04J 14/02 370/474 |
| 6,501,757 B1 | 12/2002 | Kamaraj et al. | |
| 6,553,447 B1 | 4/2003 | Arimilli et al. | |
| 6,701,390 B2 | 3/2004 | Ehmann | |
| 6,944,187 B1 | 9/2005 | Driediger et al. | |
| 7,106,738 B2 | 9/2006 | Saidi et al. | |
| 7,249,206 B2 | 7/2007 | Bilak et al. | |
| 7,320,037 B1 | 1/2008 | Maturi et al. | |
| 7,382,782 B1 | 6/2008 | Ferguson et al. | |
| 7,426,185 B1 | 9/2008 | Musacchio et al. | |
| 7,486,678 B1 * | 2/2009 | Devanagondi | H04L 49/3072 370/394 |
| 7,525,998 B2 | 4/2009 | Driediger et al. | |
| 7,729,388 B2 | 6/2010 | Brown et al. | |
| 2002/0057712 A1 | 5/2002 | Moriwaki et al. | |
| 2002/0188767 A1 | 12/2002 | Ehmann | |
| 2003/0117945 A1 | 6/2003 | Zboril | |
| 2003/0152076 A1 | 8/2003 | Lee et al. | |
| 2003/0193936 A1 * | 10/2003 | Wolrich et al. | 370/360 |
| 2004/0125751 A1 | 7/2004 | Vangal et al. | |
| 2005/0207436 A1 | 9/2005 | Varma | |
| 2006/0095593 A1 | 5/2006 | Kranich | |
| 2006/0101179 A1 | 5/2006 | Lee et al. | |
| 2006/0143334 A1 | 6/2006 | Naik | |
| 2006/0159019 A1 | 7/2006 | Buskirk et al. | |
| 2006/0190641 A1 | 8/2006 | Routliffe et al. | |
| 2006/0267989 A1 | 11/2006 | Campbell et al. | |
| 2007/0147361 A1 | 6/2007 | Lee | |
| 2007/0217453 A1 | 9/2007 | Rhoades et al. | |
| 2009/0073970 A1 * | 3/2009 | Wing et al. | 370/389 |
| 2009/0097506 A1 | 4/2009 | Subrahmanyan et al. | |

\* cited by examiner

SYSTEM AND METHOD FOR CREATING A SCALABLE MONOLITHIC PACKET PROCESSING ENGINE

CROSS-REFERENCE TO RELATED APPLICATION

This application is a continuation of U.S. patent application Ser. No. 14/050,975, filed Oct. 10, 2103, which is a continuation of U.S. patent application Ser. No. 12/145,466, filed Jun. 24, 2008, now U.S. Pat. No. 8,566,497, all of which are hereby incorporated by reference in their entirety.

BACKGROUND OF THE INVENTION

Packet Engines (PEs) are devices or Integrated Circuits (ICs or Chips) that perform packet processing, such as packet classification, policing, filtering and switching. In any given technology, there is always a practical limit in how fast a monolithic PE can be built. In order to build a higher capacity system, a number of PEs can be joined together. The traditional way of doing this is to use Modular Systems that join a number of individual PEs using a central packet switch, often implemented in the form of a packet backplane with central switch fabric, and the PEs sitting on line-cards interfacing to the backplane switch. Although Modular Systems allow the construction of very large switching systems, they can no longer be considered a "monolithic non-blocking" switch, because in these large systems, the introduction of the central fabric always introduces QoS or performance limitations with certain traffic patterns. In addition, the ability to perform shared operations across a Modular System, such as policing and protection switching on different interfaces sitting on different PEs, is lost.

This invention uses a unique design that allows two or more PEs to be joined together, while keeping the monolithic non-blocking feature-set. The Bandwidth (BW) in terms of BPS (Bit Per Second), the processing power in terms of PPS (Packets Per Second) and the number of interfaces are increased by a factor of "N", where "N" is the number of PEs joined together. Given the assumption that for a given technology one can only build PEs with capacity X, using this technique, (Multi-chip) PEs with capacity of N*X can be built.

SUMMARY OF THE INVENTION

This invention describes a novel design that can create a monolithic high capacity Packet Engine, called NPE, by connecting N lower capacity Packet Engines (PEs) via a Chip-to-Chip (C2C) interface. The C2C interface is used to perform functions, such as memory bit slicing to store packets in a distributed manner in the memory of individual PEs and to communicate shared information, such as enqueue/dequeue operations between them. This technique is a very efficient method of creating a powerful PE with higher capacity than a single PE can obtain. For certain cases, e.g. N=2, it is also possible to obtain a form of redundancy where the dual device operation can be gracefully degraded to single PE operation (and single PE performance) in case of a hardware failure. If this is coupled with the use of certain link protection protocols such as Ethernet Link Aggregation with the links being spread over the two constituent PE's, traffic can be maintained in case of a hardware failure, but at a reduced performance level.

DETAILED DESCRIPTION OF THE PREFERRED EMBODIMENTS

Carrier-class switches are typically constructed using building blocks such as NPUs (Network Processing Units) and TM's (Traffic managers). These two building blocks are often combined into a single integrated device (IC or chip), including one or more traffic interfaces (e.g. Ethernet ports). Such an IC is suitable for building carrier-class networks and is called "Packet Engine" (PE) in this document.

Packet engines perform operations like:
Packet classification into different flows with different Quality of Service (QoS)
Termination and handling of various communication protocols such as Multi-protocol Label Switching (MPLS)
Switching and routing
Ability to partition network into Virtual Private Networks
Admission control of individual flows using shared or dedicated Policers
Discard of excess traffic, according to their QoS, using techniques such as Weighted Random Early Discard (WRED)
Queuing and scheduling system
Operation and Management (OAM) functions
Protection switching mechanisms to perform fast recovery in case of network problems A PE is characterized by the fact that it can perform all of the above functionality across all of its available interfaces with no restrictions on how traffic flows between the ports. However, PE performance is also characterized by a set of basic parameters; two of the most important are the Bandwidth (BW) supported in terms of BPS (Bits Per Second) and the packet processing capability in terms of number of PPS (Packets Per Second) the PE can handle. Since PEs often need large buffer storage for the queue system (typically in external memory called RAM), the maximum BW supported by a device is very often limited by the BW of the RAM used to construct the buffer system. The packet processing capability in terms of PPS is limited by the ability to perform table lookups and packet classifications, often using a mixture of both internal and external RAM.

Figure 1:
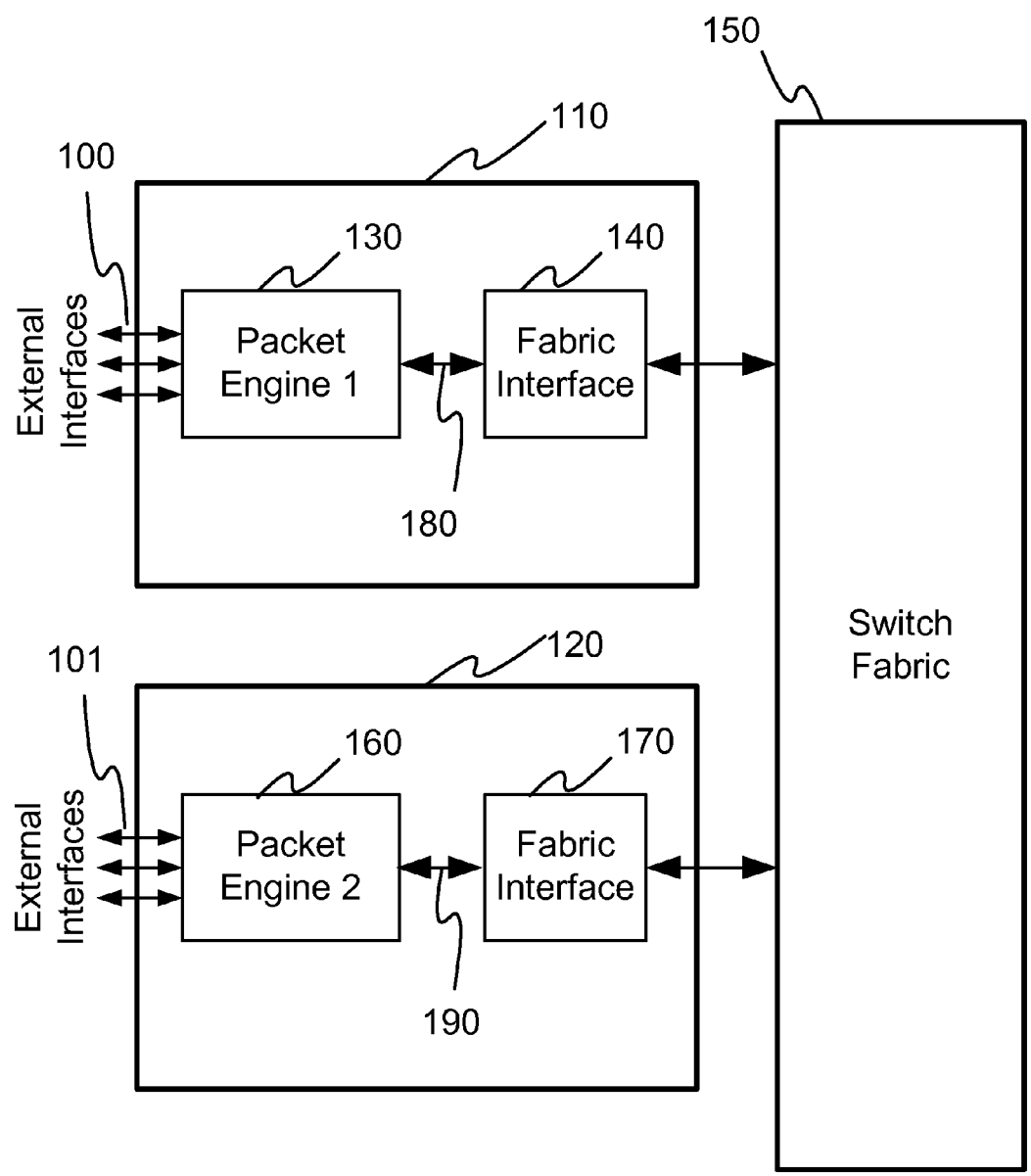
FIG. 1 is a schematic diagram of a Modular System with two line-cards and a central switch fabric.

There is always an interest in being able to construct a higher performance and larger PE to handle the ever increasing bandwidth requirements, while maintaining the service model offered by a single non-cascaded monolithic device for higher bandwidths. Using even the latest Integrated Circuit (IC) technologies, there is always a practical limit on the performance of a monolithic PE that can be built. The only way to build a higher performance PE is to join a number of monolithic PEs together. The traditional way of doing this is using a Modular System, as shown in FIG. 1. In a Modular system such as the one shown in FIG. 1, a number of individual PEs (130, 160) are connected to a central packet switch fabric (150), often implemented in the form of a packet backplane with central switch fabric chips residing on the backplane and the PEs sitting on line-cards (110, 120), interfacing to the backplane switch either directly or through fabric interface chips (140, 170). Modular systems allow the construction of very large (Tera-bit per second) switching systems, but they also have a number of drawbacks. Most importantly, the modular systems can no longer be considered a "monolithic non-blocking" switch. They behave more like a system of individual switches connected by a (internal) network, providing some form of Quality of Service (QoS). The introduction of the central fabric always introduces QoS or performance limitations with certain traffic patterns. In these large systems, the ability to perform shared operations across multiple PEs on different linecards, such as policing or protection switching, is also lost.

Figure 2:
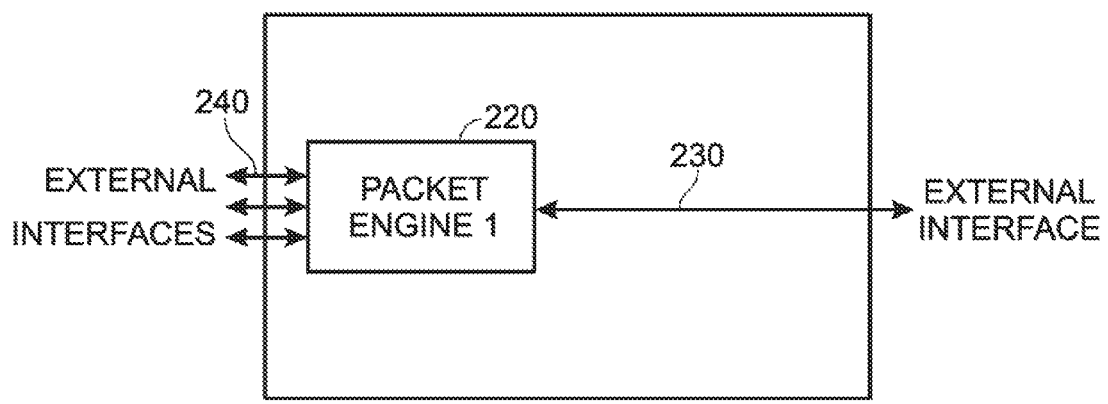
FIG. 2 is a schematic diagram of a single stand alone Packet Engine with traffic interfaces

Furthermore, the interface to the backplane switch fabric consumes bandwidth in the PE, and as such, behaves like any other traffic interface on the device. FIG. 2 shows a stand alone PE device. If the standalone PE (220) in FIG. 2 can process a total of X Gbps (Giga bit per second) BW across all its external interfaces (230, 240), it (130, 160) will only be able to handle X/2 Gbps BW on its external interfaces (100, 101) in a Modular System, because the other X/2 Gbps BW is consumed by the internal fabric interface (180, 190).

This invention uses unique design that allows 2 or more PEs to be joined together, while keeping the monolithic non-blocking features. The Bandwidth in terms of PPS, the packet processing power in terms of PPS, and the number of external interfaces can be increased by a factor of N, where N is the number of PEs joined together. This novel design enables the creation of monolithic switches that are N times more powerful than individual PEs they are constructed from. For the rest of this document, a monolithic PE constructed from N number of PEs is called "NPE". For example, a monolithic PE constructed from two PEs is called 2PE. A 2PE device, also called a dual-PE, is of special interest, since its implementation is very straight forward and with less complexity. The rest of this section describes the 2PE device, but it is equally applicable to NPE devices, as well.

An NPE device can (at any point in time) be split into its individual PE components, which can then operate individually. This allows cost effective construction of redundant hardware for certain redundancy scenarios. As an example, take the case of N=2: This will provide a graceful degradation to 50% of the 2PE bandwidth in case one device fails. Through the use of this feature, it becomes possible (at low or zero cost) to design networks and network elements which will continue to work, in case of a hardware failure, but the capacity will be reduced to (N−1)/N %. In order to achieve this, the N separate PE devices sit on separate line cards, such that a faulty PE device can be replaced, while the other PE devices continue to operate.

This invention combines a number of technologies, such as bit slicing, to achieve the NPE goal, but combines these in a novel way to create the NPE capable device.

Figure 3:
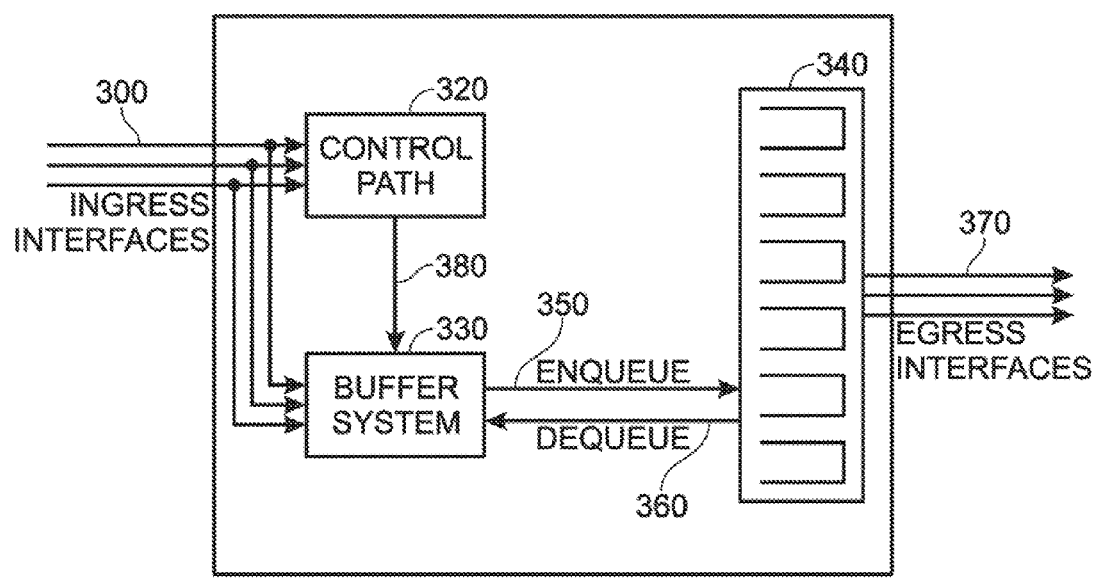
FIG. 3 is a functional diagram of a single Packet Engine (PE) operation

FIG. 3 shows the block diagram of a single PE device. The main blocks in the drawing:

Ingress traffic interfaces (300)
Control Path (320)
Buffer system (330)
Egress Queues & scheduler (340)
Egress traffic interfaces (370)

As can be seen from FIG. 3, traffic enters the PE from the ingress interfaces (300). The packets are written to the buffer memory (330), for temporary storage, as well as sent to the control path (320), for lookup, classification, policing, etc. When the control path has finished processing a given packet, the control path commands (380) the buffer memory (330) that the packet should either be discarded (packet memory freed again), or enqueued (350) in one or more egress queues (340). Multicast requires sending a packet to more than one egress queue. The egress scheduler (340) reads packets from the queues and transmits them on the egress interfaces (370). When the last copy of a packet has been transmitted, the packet memory is freed again.

Figure 4:
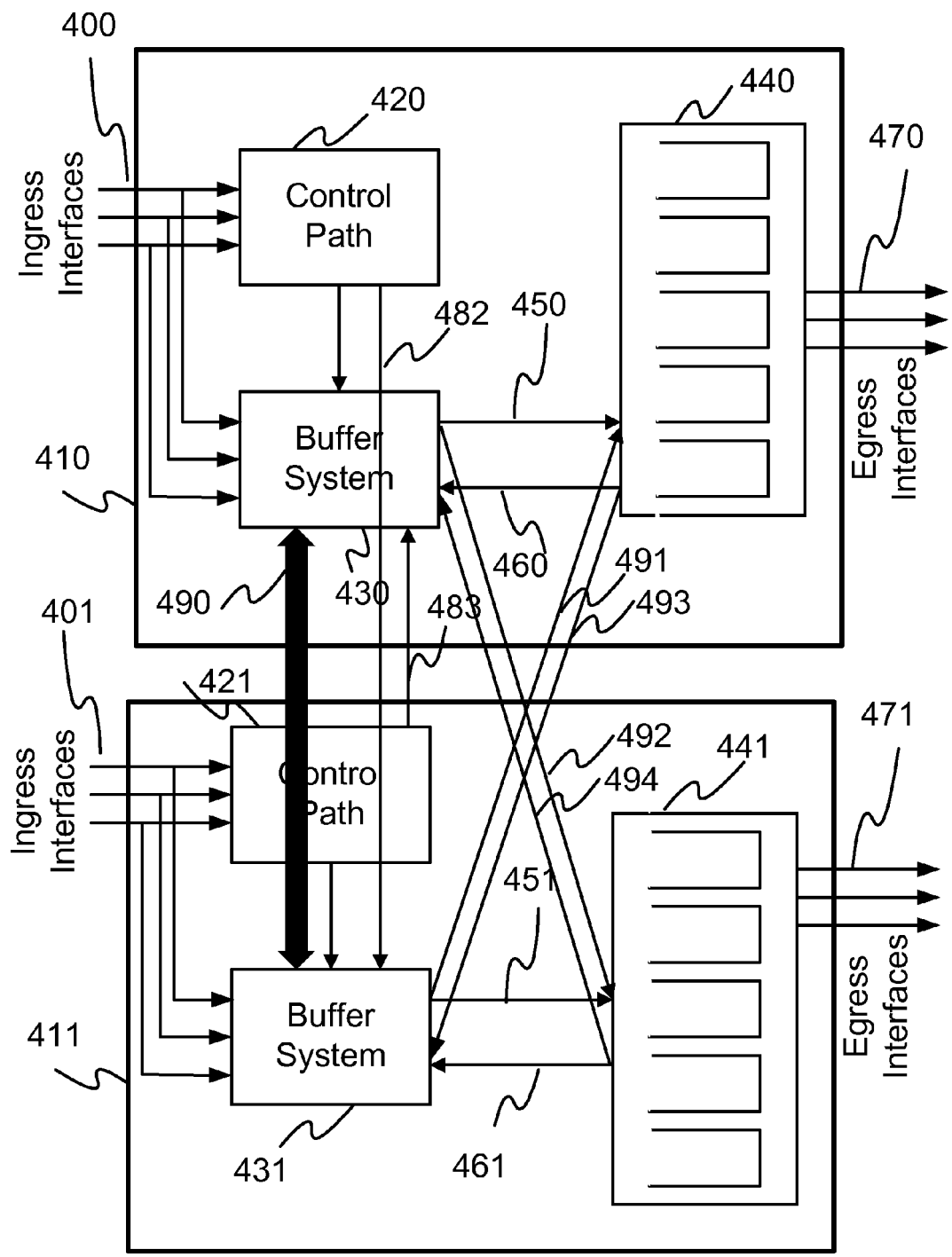
FIG. 4 is a functional diagram of a dual-PE operation

FIG. 4 shows a 2PE (dual-PE) block diagram. The 2PE operation is very similar to a single PE operation. The description here describes what goes on in one of the PE chips, but the same goes on in the other PE chip, with very few modifications (will be described below in more details). Traffic enters from ingress interfaces (400, 401), and is sent both to the control path (420, 421) and stored in the buffer memory (430, 431). Packets entering each PE (410, 411) get stored in both buffer memories (430, 431) using bit slicing technique over the Chip-to-Chip (C2C) interface (490). Since each control path (420, 421) handles only packets entering from local traffic interfaces (400, 401), they split the work between them perfectly. The buffer system uses a common bit-sliced memory, created by combining the memory interfaces on both chips. Effectively, this results in 50% of packet bits being stored in memory associated with each chip. Each chip owns and controls exactly 50% of the shared buffer memory, and has its own free list for buffer maintenance. When the control path on a PE chip has finished processing the packet, the result might be that the packet needs to be enqueued (450, 451) either on one or more local egress queues (440, 441) (on the same PE), or enqueued (491, 492) in egress queues on the other PE (440, 441). In case of local enqueues, the enqueue operation is straightforward, and very similar to single PE operation. In case of a "remote" enqueue (from one chip to the other chip), the enqueue request (482) is sent to the remote queue system over the C2C (490) bus, together with a packet pointer, which points to the packet in the shared buffer system. No packet data is transferred in this operation, because the packet is already accessible to both devices in the bit-sliced buffer memory.

Egress transmission on both chips is straightforward: The packets are read from the bit sliced memory (effectively reading from memories on both PEs), and transmitted on the egress interfaces (470, 471). However, when a complete packet has been transmitted, the buffer system on a PE does two different things, depending on whether the packet originated from itself or not. If the packet originated from the same PE, it informs the buffer manager on the same PE (460, 461) that this packet copy is no longer needed, and the buffer manager keeps track of when the last copy that has been sent, so that the memory can be returned to the free list (for this local PE chip). If the packet originated from the other PE chip, it informs the buffer manager on the other PE chip (493, 494), via C2C interface, that this copy is no longer needed. In this way, the buffer manager on each PE chip maintains full control over the memory it owns (50%), regardless of the ingress/egress traffic patterns across the two PE chips.

So, as described above, the C2C interface performs memory bit slicing and carries "remote enqueue" operations and "remote dequeue" (packet copy no longer needed) operations, as described above. There are also a number of other protocols going on over the C2C bus, which include:

1) Policing. In order to support shared policers across a dual-PE system, all policing buckets are kept (maintained) on one of the chips—called a police master. The other chip (police slave) performs policing operations by sending information (policer number, packet length, etc.) to the police master, over the C2C, and receives the police answer (primarily packet color: red, yellow, green), again, over the C2C. In this way, flows ingressing on both chips can share the same policer (or have individual policers), just as required.

2) OAM packet handling. For certain protocols like Multiprotocol Label Switching (MPLS), the ingress interface of an MPLS Tunnel can suddenly change without warning. This does not present any problem for data packets that need to be forwarded, but for connectivity check OAM packets (packets sent at fixed intervals to allow detection of a faulty link), it means that these need to be handled by a central agent, spanning both PEs. In such 2PE operation, one PE is an OAM master, and the other PE is an OAM slave. The OAM slave PE chip informs the master PE (over the C2C bus) that an OAM packet has arrived on a particular link. In this way, the OAM master is always informed about OAM packet arrival, regardless of which interface/chip the packet arrives on, and is able to perform the "loss of connectivity" check in a straightforward fashion, just as if it was done on a single chip.

3) Central Processing Unit (CPU). In a 2PE operation, each PE may reside on a different line-card. Usually, each line-card has its own CPU for performing software related functions and protocols. The C2C interface in a 2PE operation permits the two CPUs of corresponding line-cards to communicate with each other, over the C2C interface. With proper software, the two CPUs could be synchronized regarding the information about both cards, and in case of failure of one of the CPUs, the other one can take over the control and operation of both line-cards.

As the carrier class protocols evolve, there will likely be more communication going on over the C2C bus to maintain the monolithic view across both chips, but the memory bit slicing and remote enqueue/dequeue are by far the largest bandwidth users on the link now, and will likely continue to be so, in the future.

Note that N can be larger or equal to 2, in an NPE system. The bit slicing protocol scales very nicely to solutions with N>2. However, other protocols described above do not scale linearly. For example, the police master will need to handle the policing operations for all PE chips (to support shared policers across any combination of PE chips), which does not scale very well. Therefore, there is some improvement for an NPE system, but it is not scaled linearly with N. However, still, it would be helpful on the overall performance.

Any variations of the above teaching are also intended to be covered by this patent application.

The invention claimed is:

1. A packet engine system for processing a packet, the system comprising:
a first packet engine that includes a first buffer system and a second packet engine that includes a second buffer system, wherein the first packet engine includes an interface coupled to the second packet engine;
wherein the first packet engine slices the packet into bit slices stores a first portion of the bits slices and distributes a second portion of the bit slices to the second packet engine using the interface without using switch fabric; and
wherein the first buffer system and the second buffer system form a bit-sliced memory of the packet engine system, the first buffer stores the first portion of the bit slices and the second buffer stores the second portion of the bit slices.

2. The system of claim 1, wherein the first packet engine distributes the portion of bit slices to the second packet engine using the interface.

3. The system of claim 1, wherein the first packet engine distributes the portion of bit slices to the second buffer system of the second packet engine.

4. The system of claim 3, wherein the second packet engine reads the portion of bit slices from the second buffer system, and enqueues the packet using a network egress interface.

5. The system of claim 1, wherein the packet engine system has a processing power that is substantially equal to a processing power of the number of packet engines included in the plurality of packet engines.

6. The system of claim 1, wherein each packet engine of the packet engine system includes a network ingress interface for accepting packets coupled to a buffer system comprising the bit-sliced memory.

7. The system of claim 1, wherein each packet engine of the packet engine system includes a plurality of egress queues having a first interface for enqueuing and dequeuing packets, and a second interface for transmitting packets via a network egress interface.

8. The system of claim 1, wherein the packet engine system is configured to facilitate non-blocking communication using the interface without a switch fabric.

9. The system of claim 1, wherein the interface is a chip-to-chip (C2C) interface.

10. A method for processing a packet, the method comprising:
slicing the packet into bit slices using a first packet engine of a plurality of packet engines of a monolithic packet engine system, wherein the plurality of packet engines comprise an interface;
storing a first portion of the bit slices in a first buffer system of the first packet engine;
distributing a second portion of the bit slices to a second packet engine of the plurality of packet engines of a monolithic packet engine system using the interface without using a switch fabric;
storing the second portion of the bit slices in a second buffer system of the second packet engine; and
enqueuing the packet comprising the first portion and the second portion of the bit slices.

11. The method of claim 10, wherein the first packet engine distributes the bit slices to the second packet engine using an interface.

12. The method of claim 10, wherein enqueuing the packet comprises using a first network egress interface of the first packet engine to enqueue the first portion of the bit slices and using a second network egress interface of the second packet engine to enqueue the second portion of the bit slices.

13. The method of claim 10, wherein the packet engine system has the processing power that is substantially equal to the processing power of the number of packet engines included in the packet engine system.

14. The method of claim 10, further comprising accepting packets using a network ingress interface coupled to a common buffer system comprising the first buffer system and the second buffer system.

15. The method of claim 10, wherein each packet engine of the plurality of packet engines includes a plurality of egress queues having a first interface for enqueuing and dequeuing packets, and a second interface for transmitting packets via a network egress interface.

16. The method of claim 10, wherein the interface is configured to facilitate non-blocking communication between the plurality of packet engines without using a switch fabric.

17. A system comprising a plurality of packet engines of a monolithic packet engine system, a first packet engine including:
an interface coupled to a second packet engine; and
a buffer system,
wherein the first packet engine slices a packet into bit slices, stores a first portion of the bit slices in the buffer system and distributes a second portion of the bit slices to a second packet engine without using a switch fabric over the interface; and
wherein the first packet engine reads the bit slices from the second packet engine, and enqueues the packet comprising the first portion and the second portion of bit slices using a network egress interface included in one of the first and second packet engines.

18. The system of claim 17, wherein the first packet engine distributes the bit slices to the second packet engine using the interface.

19. The system of claim 17, wherein the first packet engine distributes the bit slices to a buffer system of the second packet engine.

20. The system of claim 17, wherein the monolithic packet engine has the processing power that is substantially equal to the processing power of the number of packet engines included in the plurality of packet engines.

21. The system of claim 17, wherein each packet engine of the plurality of packet engines includes a network ingress interface for accepting packets coupled to a buffer system.

22. The system of claim 17, wherein each packet engine of the plurality of packet engines includes a plurality of egress queues having a first interface for enqueuing and dequeuing packets, and a second interface for transmitting packets via a network egress interface.

23. The system of claim 17, wherein the plurality of packet engines are configured to use the interface to facilitate non-blocking communication.

24. The system of claim 17, wherein the interface is a chip-to-chip (C2C) interface.

* * * * *